United States Patent
Wallace (10) Patent No.: US 7,197,978 B2
(45) Date of Patent: Apr. 3, 2007

(54) DISCHARGE GATE FOR A FOOD PEELER

(75) Inventor: Joseph E. Wallace, Creston, IA (US)

(73) Assignee: Vanmark Corporation, Creston, IA (US)

( * ) Notice: Subject to any disclaimer, the term of this patent is extended or adjusted under 35 U.S.C. 154(b) by 259 days.

(21) Appl. No.: 10/887,614

(22) Filed: Jul. 9, 2004

(65) Prior Publication Data

US 2006/0005715 A1   Jan. 12, 2006

(51) Int. Cl.
*A23N 7/00* (2006.01)

(52) U.S. Cl. .......................................... 99/630; 99/623

(58) Field of Classification Search .................. 99/539, 99/540, 623–631, 546, 516–519, 600, 601, 99/639, 645, 585, 584; 15/3.16, 3.19, 3.2; 426/481–483
See application file for complete search history.

(56) References Cited

U.S. PATENT DOCUMENTS

| | | | | |
|---|---|---|---|---|
| 3,745,914 A | * | 7/1973 | Wallace | 99/630 |
| 4,237,782 A | * | 12/1980 | Bichel | 99/625 |
| 4,519,305 A | * | 5/1985 | Vanosdall | 99/625 |
| 5,858,429 A | | 1/1999 | Wallace | |
| D442,035 S | | 5/2001 | Wallace | |

* cited by examiner

*Primary Examiner*—Timothy F. Simone (57) ABSTRACT

An improved discharge gate for a food peeler having an S-shaped portion edge such that a food item is able to uniformly flow from the peeling chamber out of the discharge gate and at the same time, the gate causes efficient flow within the peeling chamber of the peeling device such that all of the food items within the peeler are uniformly peeled.

8 Claims, 7 Drawing Sheets

DISCHARGE GATE FOR A FOOD PEELER

BACKGROUND OF THE INVENTION

This invention relates to a discharge gate on a food peeling machine. More specifically, this invention relates to a discharge gate that regulates the discharge flow of potatoes from the potato peeling machine.

The peeling of mass amounts of potatoes is a very intricate process that involves a peeling machine that has a hopper with an auger therein for moving potatoes to a peeling chamber that has a plurality of elongated abrasive rollers that are in an arcuate juxtaposed position. As the potatoes are skinned by the abrasive material they move towards the outlet end of the peeling chamber and towards the discharge gate. The discharge gate of the peeler has several functions, for example, when a discharge gate covers most of the outlet end, potatoes are unable to flow out of the peeling chamber and consequently, a high density of potatoes are trapped in the peeling chamber. This high density causes additional force on the potatoes that are being pushed against the abrasive rolls causing additional peeling and waste. Consequently, by adjusting the quantity of potatoes flowing out of the discharge gate of the peeler, one can adjust the amount of peeling that the potatoes within the peeling chamber undergo.

To ensure that a potato is completely peeled when discharging the peeling chamber, the outlet end of the peeling chamber must be partially covered by a discharge gate. Known in the art are flat discharge gates that merely prevent potatoes from being discharged out of the peeling chamber thus causing more density within the peeling chamber. Though these discharge gates result in a more peeled potato, problems still remain. For example, because of the flow properties within the peeling chamber, some potatoes tend to stick in the bottom of the peeling chamber and thus not only are completely peeled, but in fact, the potato becomes very worn. Also, the potatoes on the top tend to flow through the peeling machine without being completely peeled. When blocking the outlet end, potatoes coming out of the discharge gate fall a distance onto an outlet ramp thus causing nicks and bruises to the potato.

Because of the drawbacks of the discharge gate that merely blocks the outlet end of a potato peeling chamber, attempts have been made to curve the discharge gate in order to allow for an opening for the potatoes to flow out of peeling chamber and not fall over the top of the gate. Though this arcuate or curved portion has helped prevent some potatoes from falling over the top of the gate, potatoes still fall over the top of these gates causing damage to the potatoes and creating inconsistent flow out of the gates. Additionally gates in the art cause potatoes to be shirred on the edge of the gate. Furthermore, flow problems within the peeling chamber remain.

Consequently, there is a need in the art to provide an improved discharge gate for a potato peeler that is shaped such that a uniform flow of potatoes flows out of the peeling chamber and such that the flow characteristics within the chamber allow for similar peeling of each potato in the chamber.

Therefore, it is a primary object of the present invention to provide a potato peeling discharge gate that allows for uniform flow of potatoes out of a peeling chamber thus improving upon the state of the art.

Yet another object of the present invention is to provide a discharge gate that allows for proper flow of potatoes within the peeling chamber thus maximizing the efficiency of the peeling of each potato.

Another object of the present invention is to provide a discharge gate that will prevent potatoes from being shirred on the gate thus minimizing the damage to potatoes exiting the peeling chamber.

Yet another object of the present invention is to provide a discharge gate that prevents potatoes from falling over the top or straight edge portion of the discharge gate.

A further object of the present invention is to use an S-shaped portion to improve flow characteristics within and out of a peeling chamber.

These and other objects, features, or advantages of the present invention will become apparent from the specification and the claims.

BRIEF SUMMARY OF THE INVENTION

The present invention is an improved discharge gate for a peeling machine. The machine has a hopper with a supply auger for moving a food item, such as a potato, to a peeling chamber. The chamber consists of a plurality of parallel longitudinal abrasive rollers arranged in arcuate juxtaposed relation. The discharge gate has an S-shaped portion for an edge thus providing uniform flow out of the peeling chamber. Additionally, for improved flow the S-shaped portion can extend in axial relation toward the inlet end of the peeling chamber.

DETAILED DESCRIPTION OF THE EMBODIMENTS OF THE INVENTION

Figure 5:
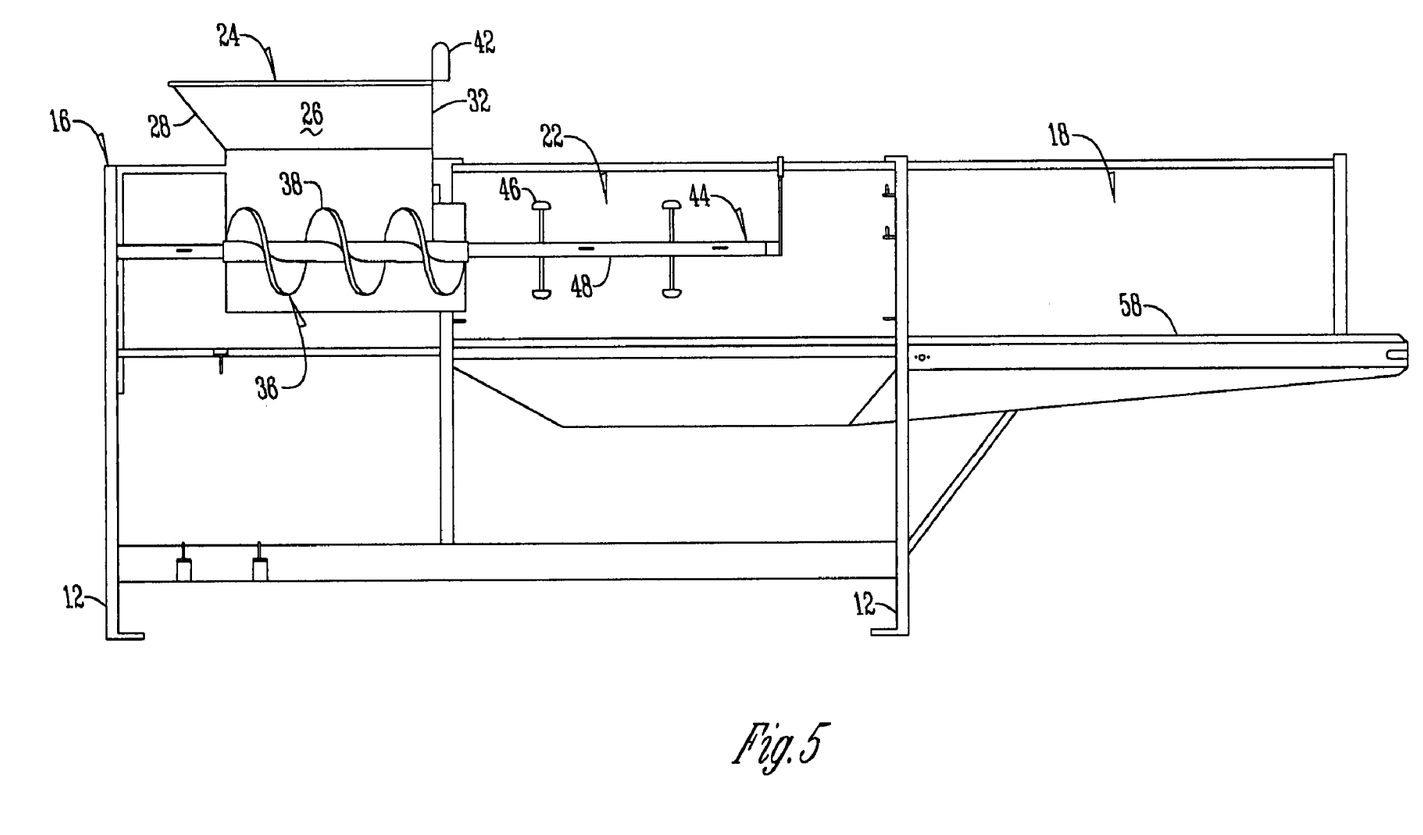
FIG. 5 is a longitudinal sectional view taken along the lines 5—5 in FIG. 1.

The peeling machine, device or means of the present invention is generally denoted by the reference numeral 10 in the drawings and this description. Referring to FIGS. 1–3 and 6, the peeling machine 10 has a plurality of supporting elements or legs 12 supporting an elongated body 14. The body 14 includes an infeed section 16, an output section 18 and a peeling section 20 between the infeed and output sections 16,18. The peeling section 20 comprises a peeling compartment or chamber 22 substantially enclosed by a plurality of walls (FIG. 5).

The infeed section has a hopper 24 with a top opening for depositing the product to be peeled. The hopper walls 26,28,30,32 are slanted inwardly and their lower edges define a bottom opening or mouth 34 disposed above an infeed auger 36. The infeed auger 36, hereinafter referred to as auger, has one or more helical auger flight(s) 38 which provide a continuous and consistent product infeed rate to the peeling chamber. The auger 36 and hopper 24 eliminate pinch points and product damage by wrapping the hopper wall 32 around the auger 36 to the ten o'clock position looking in the direction of product flow. This ten o'clock position allows product to seek a path either one side or the other of the auger flight 38. The product is not drawn into a pinch point, which would happen if the hopper wall 32 was tangentially vertical to the outer circumference of the auger. The auger rotation is counter-clockwise and creates a down movement at the point of tangency. A lip 40 is formed at an obtuse angle at the bottom portion of wall 30. Thus, the bottom opening 34 of the hopper 24 is non-parallel to the edge of the flight 38. The combination of the hopper surfaces 28–32,40, hopper opening 34 and auger flight(s) 38, allow product to be run with no damage. The rotational speed of the auger 36 and its cubic displacement govern the product feed rate to the peeling chamber 22.

A limit switch 42 controls two levels within this hopper 24: 1) the top of the flights, and 2) the top of the hopper 24. Loading product to the first level (to the top of the flights) ensures the auger 36 is completely filled therefore the displacement of this auger 36 will feed product into the peeling chamber 22 at an exact, continuous, and consistent rate. When the auger 36 is running the limit switch 42 will stop the peeler 10 if the product level falls below the top of the flights 38. This ensures a consistent product infeed rate to the peeling chamber 22. Secondly, this limit switch 42 also controls the upper level of the hopper 24 (capacity) and signals incoming product transporting devices to shut off when this limit is reached. The speed control of this hopper 24 is meant to be at the disposal of the operator who must adjust the throughput rate of the peeler 10 to match other equipment to provide a continuous flow through the entire line.

Figure 4:
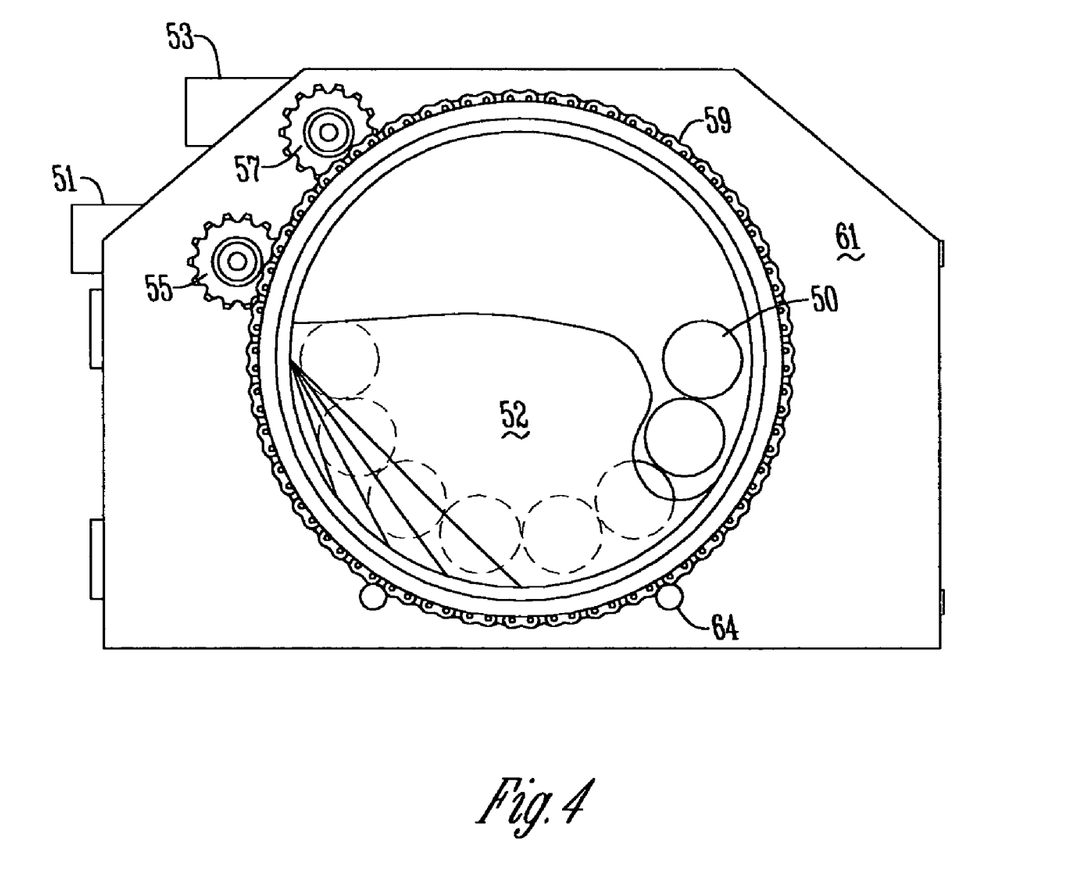
FIG. 4 is a sectional view showing the reversed or inner side of the discharge gate of FIG. 2.

Moving into the peeling chamber 22 and referring to FIG. 5, a product tumbler 44, hereinafter referred to as tumbler, is rotatably mounted therein and driven in conventional manner. The tumbler 44 has flexible paddles 46 mounted on a generally horizontal shaft 48 in the center of the peeling chamber 22. The tumbler 44 extends substantially parallel to the longitudinal axis of the elongated peeling rolls 50 (FIG. 4). This assures that regardless of the friction between peeling surface and product that the product will tumble by the action of this tumbler. The tumbler 44 rotates in the same direction as the product would naturally move in the peeling chamber 22.

The peeling rolls 50 comprise a series of shafts upon which are installed rolls having various types of surfaces; such as abrasive, brush, pintle, lift, etc. Rolls 50 touch the product and peel, wash or otherwise have contact with or act upon the product. The rotational speed of the rolls 50 is adjustable and clockwise in the direction of the product flow. On exceptions, multiple or individual rolls 50 may rotate in an opposite direction to adjacent rolls 50 to intentionally create a pulling motion to eliminate debris from the peeling chamber 22, i.e. for cleaning purposes. As product moves longitudinally along these rolls 50 a continuous effect between peeling rolls and product provides the required end result of peeled or washed product.

Adjustment to the speed of the peeling roll 50 is one means of creating a desired effect; a second means is adjusting the load or amount of product within the peeling chamber 22. The time product takes to travel the length of the rolls 50 is the time allowed to peel or wash to accomplish the desired end result, however this time is a factor of the total line capacity and therefore retention time is not a part of this invention theory. With this in mind, adjustments such as roll speed and load level within the peeling chamber are the controls used to create the desired peeling or washing effect.

As the peeling rolls 50 rotate they create tumbling action within the machine 10. This natural tumbling of the product, or when assisted by a tumbler 44, creates action of the product within the peeling chamber 22. This action allows all of the outer surface of the product to come in contact with the peeling or washing surface of the rolls 50. This area of contact is measured by the diameter times the length of the peeling roll 50 and gives square feet of surface area for the product to contact. Increasing the rotational speed of the rolls 50 increases the available area for the product to contact the peeling or washing surface. Inversely with the decrease of the rotational speed of the rolls 50 the surface area is decreased. This is known as the amount of peeling or washing area.

Figure 1:
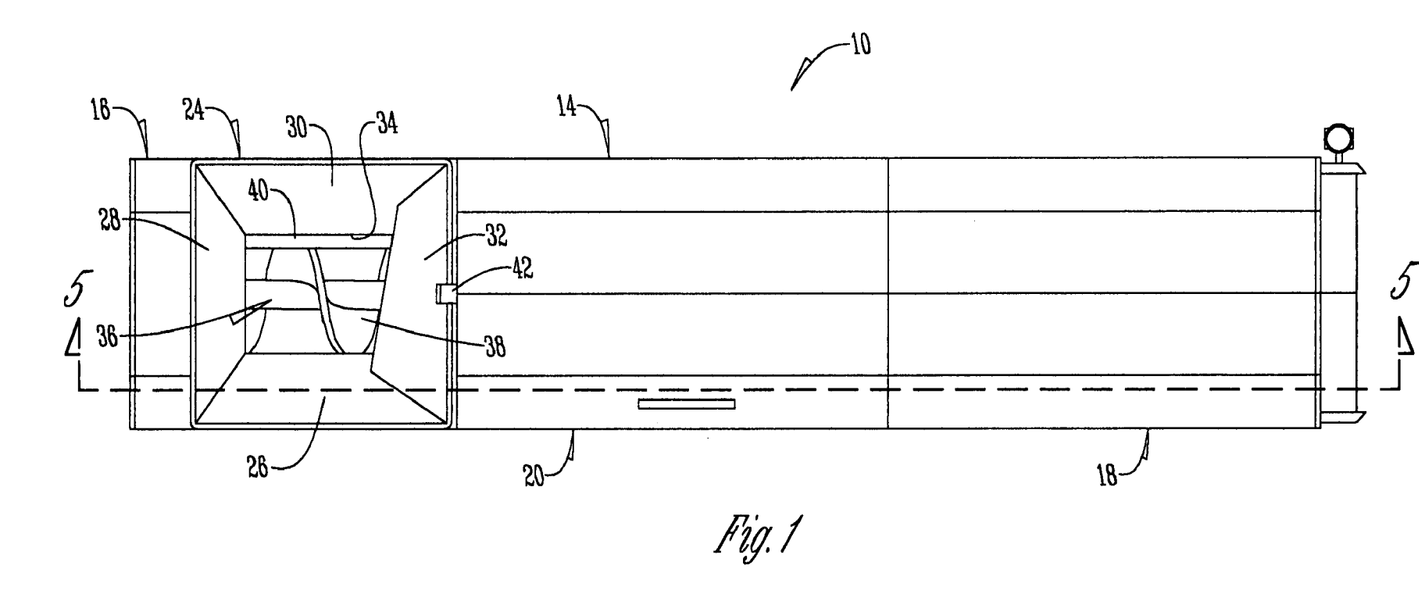
FIG. 1 is a top plan view of a peeling machine equipped with the present invention.
Figure 2:
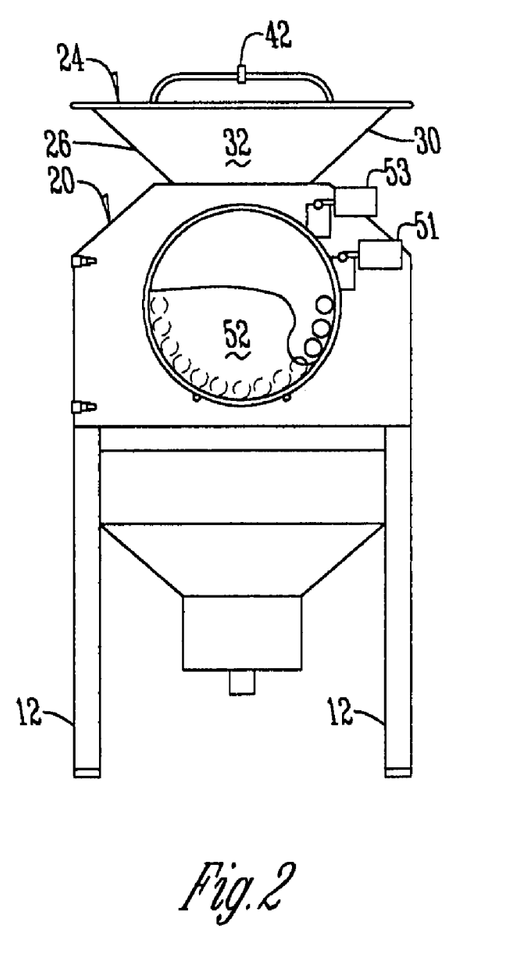
FIG. 2 is an end elevation view showing the discharge gate.
Figure 3:
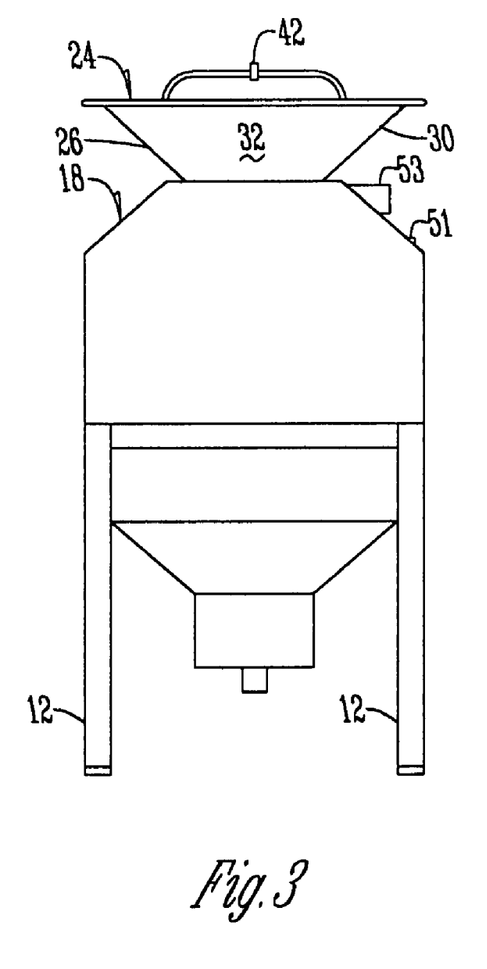
FIG. 3 is an end elevation view of the end opposite the discharge gate.

Moving to the output section 18 of the peeler 10 and referring to FIG. 2 the discharge gate 52, hereinafter referred to as gate, is an adjustable load level control device. The gate 52 creates an adjustable restriction of the product level within the peeling chamber 22; i.e., the higher the dam and deeper the water. As best seen in FIG. 4, a pair of motors 51, 53 respectively drives sprockets 55, 57 which engage a chain 59 fixed to the periphery of the discharge gate 52. The gate 52 is journaled in a surrounding frame 61 and guided by guide rollers 64 so as to rotate and thereby be adjustable between open and closed positions when driven by the sprockets 55, 57.

Product load within the peeling chamber 22 is varied by the position of the discharge gate 52. As the gate 52 is closed it creates a deeper load of product in the peeling chamber 22 creating more pressure between the product and the peeling surface by building product on top of product. As the gate 52 is opened it allows product to flow from the machine creating a lesser depth of load in the peeling chamber 22 thus creating less pressure between product and peeling surface. This is known as the effect of the peeling or washing surface.

Therefore, with a consistent and continuous infeed rate and a given capacity of product throughput, the two adjustments needed for the desired end product result are effect and amount of the peeling or washing surface. The gate position determines the effect and rotational speed of the rolls 50 determines the amount. These two adjustments will interact with each other at any volume of throughput within the machine's range of volume and speed. The primary control is the position of the gate 52 (effect); the secondary control is the roll speed (amount). With consistent and continuous input capacities dictated by the control of the auger 36, and balanced controls between gate position and roll speed, end product results can be predicted.

Figure 6:
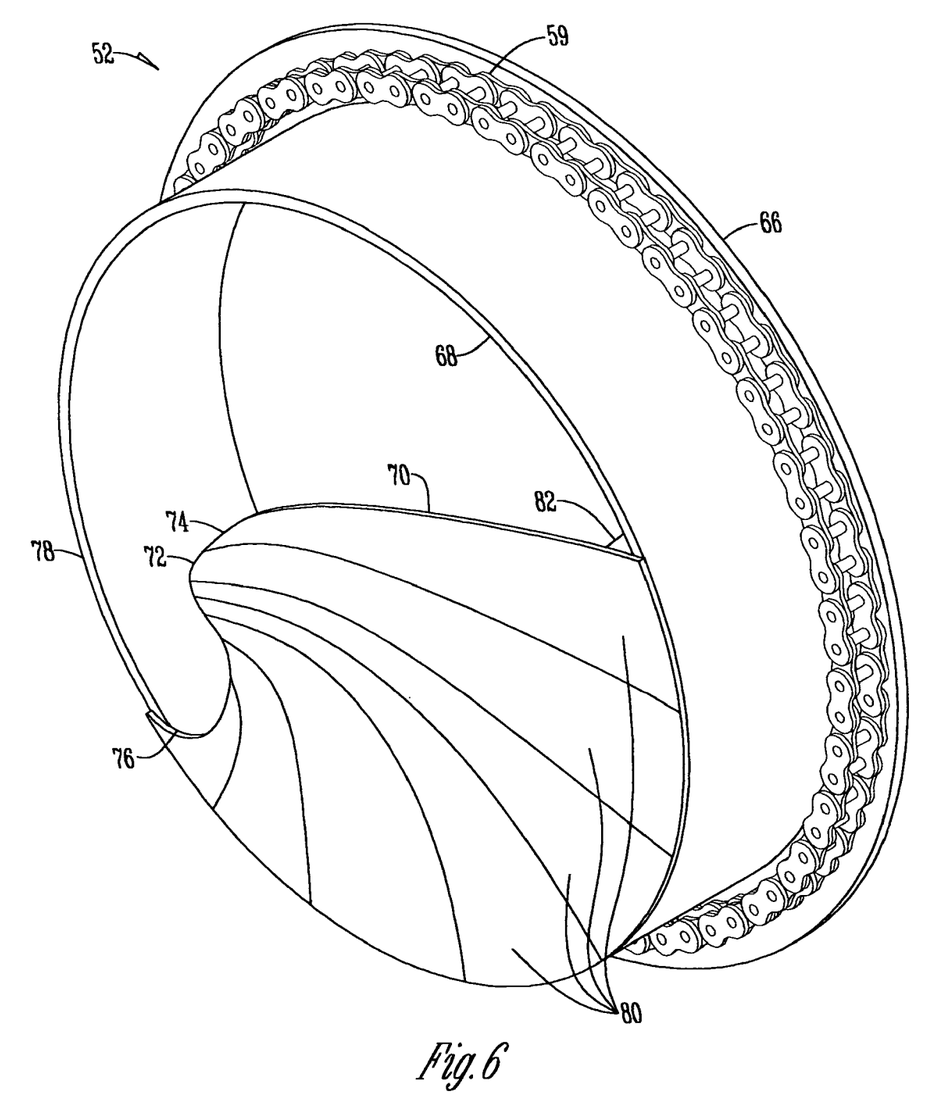
FIG. 6 is a perspective view of the discharge gate of the present invention.
Figure 7:
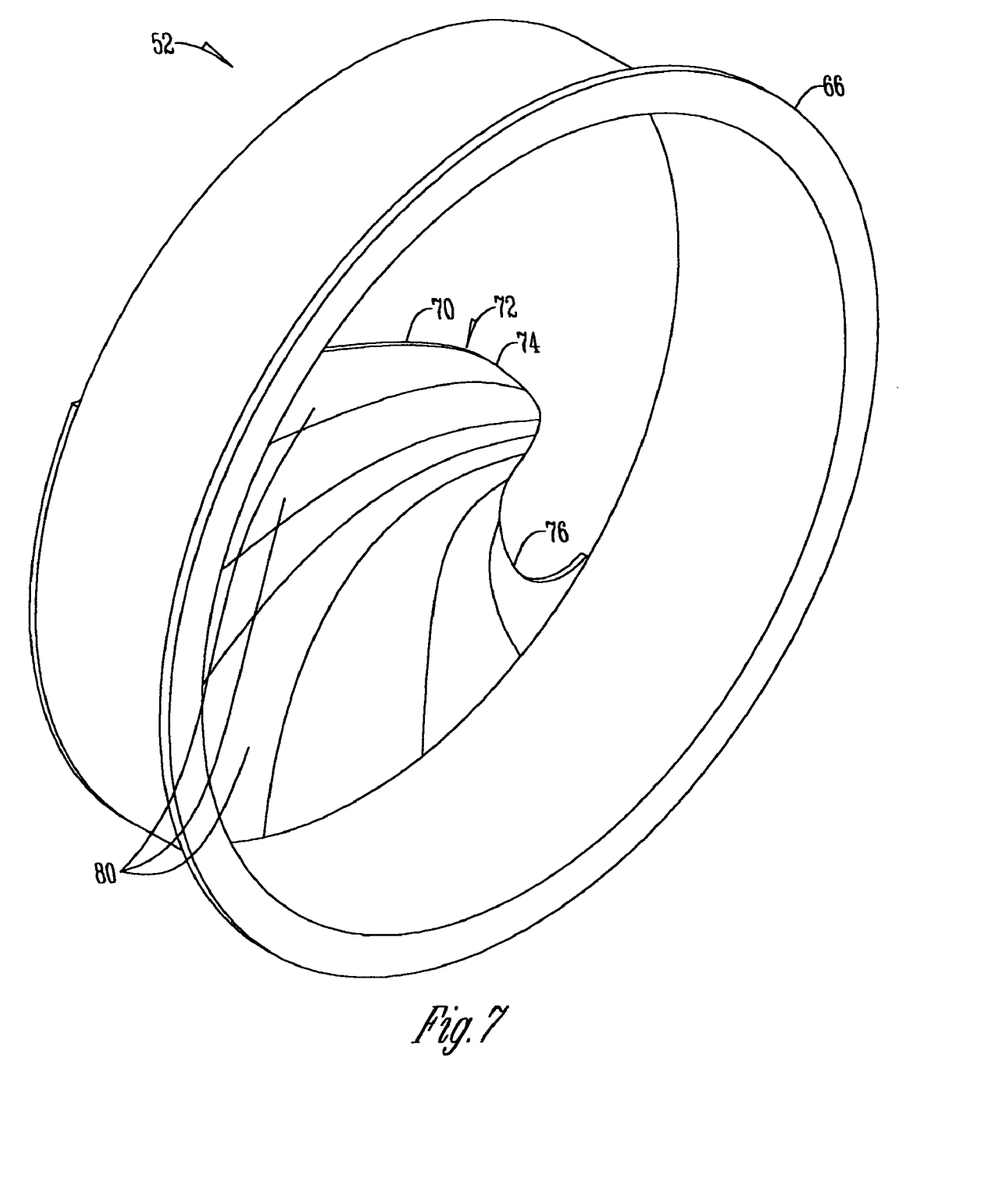
FIG. 7 is a perspective view of the opposite side of the discharge gate of the present invention.

FIGS. 6 and 7 show the discharge gate 52 of the present invention. The gate 52 has a circular ring 66 that rests against the chain 59 and coming off the ring 66 is an annular flange 68 defining the outlet port. Extending in axial relation to the annular flange 68 is a straight edge portion 70 that extends away from the ring 66. This straight edge portion 70 terminates in a curved S-shaped portion 72 that is formed from a first arcuate section, or portion 74 and a second arcuate section or portion 76. The first arcuate portion 74 of the S-shaped portion 72 extends outwardly from ring 66 to an apex and then from the apex forms the second arcuate portion 76 that extends inwardly toward the ring from the apex. The second arcuate portion 76 of the S-shaped portion 72 forms an opening in the gate for the expulsion of potatoes from the peeling chamber 22 and terminates in a flange element 78. One should appreciate that the straight edge 70 and the S-shaped portion 72 are formed from the ends of a plurality of wedge members 80. Additionally, a shelf element 82 is located between the annular flange 68 and the straight edge portion 70 for support.

Figure 8:
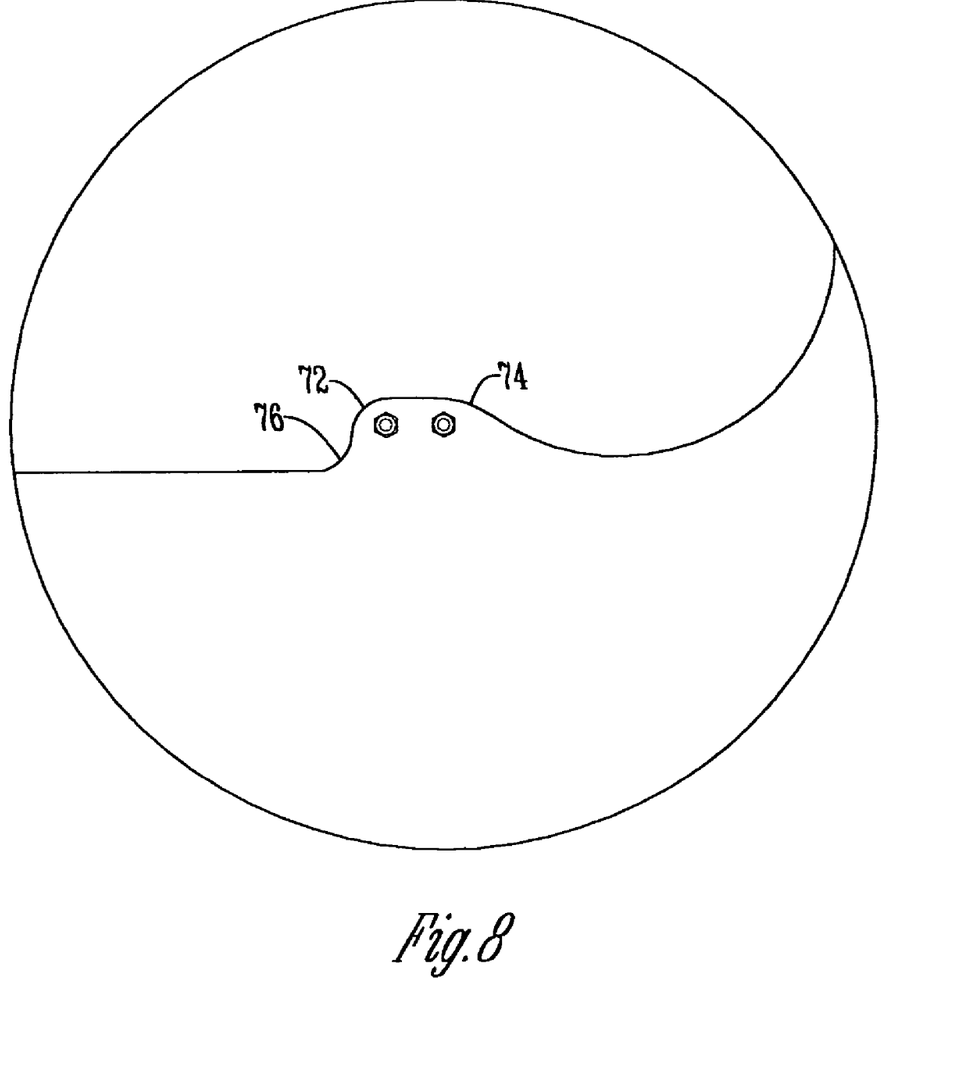
FIG. 8 is a side plan view of an alternative embodiment of the present invention.

FIG. 8 shows an alternative embodiment of the present invention. In this embodiment the discharge gate 52 does not extend in axial relation from the annular flange 68 nor has arcuate portions that extend axially. Instead, the gate has an S-shaped portion 72 that, enhances the flow of potatoes and other food items out of the peeling chamber 22 as compared to discharge gates known in the art. Though optimal flow characteristics are not achieved in this embodiment the S-shaped portion 72 improves flow and is easier to manufacture than the preferred embodiment.

In operation, the flow of potatoes to the outlet end of the peeling chamber 22 comes upon the discharge gate 52. The unique shape of the discharge gate causes potatoes to funnel toward the opening formed by second section 76 of the S-shaped portion 72 by preventing the potatoes from flowing over the straight edge portion 70. Additionally the first arcuate section 74 funnels potatoes away from the straight edge portion 70 thus preventing potatoes from being log jammed in the corner of the peeling chamber so that proper roll over and flow within the peeling chamber 22 occurs to ensure uniform peeling of each individual potato. One will appreciate that this shape allows for uniform flow of potatoes out of the gate 52 without the potato having to fall a great distance and reduces the chance that the potato will be shirred on the edge of the gate thus limiting the damage to potatoes. Consequently, this discharge gate 52 achieves all of its stated objectives.

It will be appreciated by those skilled in the art that other various modifications could be made to the device without the parting from the spirit in scope of this invention. All such modifications and changes fall within the scope of the claims and are intended to be covered thereby.

What is claimed is:

1. A product peeling machine for controlling removal of peeling from a potato product being passed into a hopper having a supply auger for discharge of the potato product into a peeling chamber having a plurality of parallel longitudinal abrasive rollers arranged in an arcuate juxtapositioned relation, with a rotatable discharge gate movable between open and closed positions, comprising:

said discharge gate rotatably mounted in a discharge opening of said chamber; and said discharge gate comprising a straight edge portion intersecting a S-shaped portion.

2. The product peeling machine of claim 1 wherein the S-shaped portion of the gate comprising a first and second arcuate sections.

3. The product peeling machine of claim 1 wherein the straight edge portion and S-shaped portion are formed from the ends of a plurality of wedge elements.

4. A product peeling machine for controlling the removal of peeling from a potato product being passed into a hopper having a supply auger for discharge of the product into a peeling chamber having a plurality of parallel longitudinal abrasive rollers arranged in an arcuate juxtapositioned relation, with a rotatable discharge gate movable between open and closed positions, comprising:

said discharge gate rotatably mounted in a discharge opening of said chamber; and said gate comprising a straight edge portion terminating in a curved S-shaped portion that is formed from a first arcuate section and a second arcuate second wherein the S-shaped portion extends outwardly from a ring element to an apex and then from the apex forms the second arcuate portion that extends inwardly toward the ring from the apex such that the second arcuate portion forms an opening in the gate for expulsion of potatoes.

5. The product peeling machine of claim 4 wherein the straight edge portion and S-shaped portion are formed from the ends of a plurality of wedge elements.

6. A discharge gate for a product peeling machine comprising:

a ring element;

an annular flange extending outwardly away from the ring element; and an S-shaped portion extending in axial relation outwardly from the annular flange.

7. The discharge gate of claim 6 further comprising a straight edge portion extending in axial relation outwardly from the annular flange and intersecting the S-shaped portion.

8. The discharge gate of claim 6 wherein the S-shaped portion is comprised of a first and second arcuate sections.

* * * * *